United States Patent [19]

Younes

[11] Patent Number: 4,757,123
[45] Date of Patent: Jul. 12, 1988

[54] METHOD FOR THE PREPARATION OF RIGID CAST OR TRANSFER MOLDED THERMOSET POLYISOCYANURATE COMPOSITIONS

[75] Inventor: Usama E. Younes, Newtown Square, Pa.

[73] Assignee: Arco Chemical Company, Newtown Square, Pa.

[21] Appl. No.: 80,836

[22] Filed: Aug. 3, 1987

[51] Int. Cl.⁴ .............................................. C08G 18/18
[52] U.S. Cl. ...................................... 528/53; 528/54; 264/331.12
[58] Field of Search ............... 528/53, 54; 264/331.12, 264/DIG. 19, DIG. 53, DIG. 77

[56] References Cited

U.S. PATENT DOCUMENTS 4,709,002 11/1987 Younes ................................ 524/712

Primary Examiner—Maurice J. Welsh
Attorney, Agent, or Firm—Delbert E. McCaslin

[57] ABSTRACT

A method for the preparation of cast or transfer molded rigid polyisocyanurate polymer composition by conveying from a mixing chamber into a mold cavity of desired configuration to react at temperatures of from about ambient to about 140° C. a reaction mixture of an organic di- or polyisocyanate, a cyclic alkylene carbonate and a soluble adduct of a tertiary amine and a cyclic alkylene carbonate as catalyst.

12 Claims, No Drawings

METHOD FOR THE PREPARATION OF RIGID CAST OR TRANSFER MOLDED THERMOSET POLYISOCYANURATE COMPOSITIONS

RELATED APPLICATION

This application is related to Usama E. Younes application Ser. No. 06/871,003 filed June 5, 1986 now U.S. Pat. No. 4,709,002 and entitled Method For the Preparation of Rigid Non-Cellular Reaction Injection Molded Thermoset Polyisocyanurate Compositions.

FIELD OF THE INVENTION

This invention relates to a method for the preparation of rigid cast molded or transfer molded polyisocyanurate thermoset polymer compositions by conveying, optionlly under pressure, a reaction mixture into a mold of the desired configuration.

BACKGROUND OF THE INVENTION

The preparation of molded articles such as phenolics, melamines and silicones by transfer molding is known and has become popular as a molding technique for certain parts and articles having intricate sections as well as molded inserts and those requiring close tolerances, as well as reduced mold cycle times. Generally the term transfer molding as referred to in the literature is applied to a process of forming articles in a closed mold from a thermosetting reaction mixture that is conveyed, usually under pressure, from an auxiliary chamber or pot. The various types of transfer molding known in the art are generally referred to as the pot type and include plunger molding using cams, transfer molding in a compression press and screw transfer molding. Transfer molding (referred to in the trade as Resin Transfer Molding or RTM) and its various intricacies and advantages are described for example in the Plastics Engineering Handbook, 4th Edition, pp 220–240, Van Nostrand Reinhold Co. and incorporated herein by reference.

The preparation of polyisocyanurate foams using a wide variety of trimerization catalysts has been suggested and used (See, for example U.S. Pat. No. 4,033,908 and references cited therein).

U.S. Pat. Nos. 3,878,156, 3,883,466 and 3,886,102 all describe the preparation of rigid polyurethane compositions from polyether polyols, isocyanates, organic carbonates and non-amine containing metallic catalysts.

U.S. Pat. No. 4,035,331 discloses a rigid non-cellular polyurethane composition using an amine initiated polyol, an isocyanate and a liquid modifier of an organic carbonate.

U.S. Pat. No. 3,703,520 describes the preparation of an insoluble trimerization adduct catalyst of ethylene carbonate and triethylene diamine.

SUMMARY OF THE INVENTION

According to the present invention there is provided an improved method for making a rigid cast or transfer molded polyisocyanurate thermoset polymer composition which comprises conveying from a mixing chamber or kettle into a mold cavity to react at ambient or elevated temperatures, a reaction mixture of an organic di-or polyisocyanate, a cyclic alkylene carbonate and a soluble amine-carbonate adduct as catalyst.

It is a primary object of this invention therefore, to provide an improved method for the preparation of a rigid polyisocyanurate thermoset composition having improved properties by cast molding or transfer molding techniques with fast demold time.

It is another object of this invention to provide a molded product from low viscosity components which can be molded under a variety of conditions ranging from ambient to elevated temperatures to give a completely cured part in less than 5 seconds or delayed for up to 20 minutes where additional pot life and processing time might be required.

Another object of this invention is to provide a cast or transfer molded polyisocyanurate having exceptional composite properties using high density glass mats.

These and other objects and advantages of this invention will become apparent from the description of the invention and from the claims.

DETAILED DESCRIPTION OF THE INVENTION

In accordance with the present invention, rigid polyisocyanurate thermoset polymer compositions are prepared by cast molding or transfer molding by conveying from a mixing vessel such as a chamber, pot or kettle, into a mold cavity of desired configuration, (which mold may have the ability to be compressed) to react at temperatures of from about ambient to about 140° C a reaction mixture of an organic di- or polyisocyanate and from about 2 to about 50 parts by weight of a cyclic alkylene carbonate, based on the isocyanate-carbonate composition, and a soluble adduct of a tertiary amine and a cyclic alkylene carbonate as catalyst at a concentration of from about 0.005 to about 5.0 weight percent based on the total composition.

A wide variety of organic isocyanates including aliphatic, alicyclic and aromatic polyisocyanates may be employed in the instant invention and are characterized by containing two or more isocyanate (NCO) groups per molecule. Typical organic di- or polyisocyanates include p-phenylene, diisocyanate, polymethylene polyphenyl isocyanate, toluene-2,4- and 2,6-diisocyanate or mixtures thereof, diansidine diisocyanate, hexamethylene diisocyanate, naphthalene-1, 4-diisocyanate, naphthalene-1, 4-diisocyanate, octylene-1, 8-diisocyanate, 4,4'-diphenylpropane diisocyanate, 3,3'-dimethyl diphenylmethane-4,4'-diisocyanate, triphenylmethane triisocyanate, 3,3'-ditolylene-4,4'-diisocyanate, 4-chloro-1, 3-phenylene diisocyanate, 1,4-, 1,3-and 1,2-cyclohexylene diisocyanate and in general the isocyanates disclosed in U.S. Pat. No. 3,577,358. Mixtures of polyisocyanates may be used which for example are the crude mixtures of di and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. The organic polyisocyanates may be isocyanate-ended prepolymers made by reacting under standard known conditions, an excess of a polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glycol, etc. as well as glycols or poly glycols partially esterfied with carboxylic acids including polyester polyols and polyether polyols. Known processes for the preparation of polyamines and corresponding methylene bridged polyphenyl polyisocyanates there-from are disclosed in the literature and in many patents; for example U.S. Pat. Nos. 2,683,730, 2,950,263, 3,012,008, 3,334,162 and 3,362,979. The isocyanates may contain impurities or additives such as the carbodiimides or uretonimine modified MDI products. The preferred polyisocyanates are the diphenylmethane diisocyanate 2,4' isomers which may include the 2,2' isomer and the higher functional polyisocyanate polymethylene polyphenyl isocyanate mixtures, which may contain from about 20 to about 85 weight percent of the diphenylmethane diisocyanate isomers. In general the organic isocyanates will have a molecular weight in the range of between about 100 and about 10,000. Typical of the preferred polyisocyanates are those sold commercially as "Isonate 143-L" and "Isonate 181" by the Dow Chemical Company a carbodiimide modified diphenylmethane diisocyanates and an ethylene glycol capped isocyanate prepolymer having 22.9% NCO respectively, "Rubinate LF168" and "Rubinate LF179" (Rubicon Chemical Inc.) and similar diisocyanates. The amount of isocyanate employed in the cast or transfer molding process will be from about 95 to about 50 and preferably from about 80 to about 65 parts by weight based on the isocyanate-alkylene carbonate ingredients in the reaction mixture.

The cyclic alkylene carbonates employed in the present invention in amounts of from about 2 to about 50 preferably from about 10 to about 25 parts by weight based on the isocyanate-carbonate composition have the general formula:

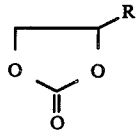

Wherein R is hydrogen, $CH_3$, $C_2H_5$ or $C_3$ to $C_{10}$ hydrocarbons. Typical cyclic alkylene carbonates include, for example, ethylene carbonate, propylene carbonate, butylene carbonate styrene carbonate and octylene carbonate, mixtures thereof and the like. Liquid alkylene carbonates are preferred, however, solid or semi-solid carbontes may be used if liquified with other liquid alkylene carbonates or by the reaction temperature at which they are employed. Propylene carbonate is the preferred cyclic alkylene carbonate. The catalysts employed in the instant invention in concentrations of from about 0.005 to about 5.0 and preferably about 0.008 to about 1.0 weight percent based on the total composition, for the formation of the cast or transfer molded polyisocyanurate polymer are trimerization catalysts and are soluble complex adducts of the reaction of a tertiary amine and the cyclic alkylene carbonates as set forth hereinabove. The preferred catalyst is an adduct of of triethylene diamine (DABCO) and propylene carbonate. In order for the catalysts of the instant invention to provide optimum molding results, i.e., catalyze the cast or transfer molding reaction in 2 minutes or less, they should be essentially reacted for periods of from about 1 hour to about 90 days which time period will be dependent on the given catalyst concentration and temperature during reaction. Reaction at ambient temperatures may be employed and would generally be about 12 hours at, for example, a concentration of about 0.5 weight percent. Lesser periods would be realized at higher temperatures, e.g. about 40° C. to about 120° C. and/or at increased concentrations.

Although not essential to the practice of this invention, the use of commonly known additives which may enhance color or properties of the polyisocyanurate polymer may be used if desired. For example, reinforcing materials which may be in powder, granular or long fiber form such as chopped or milled glass fibers, as well as woven, braided, knitted or stitched glass fibers, chopped or milled carbon fibers, silicon fibers, synthetic fibers such as nylon or "Kevlar", polyethylene or polypropylene fibers or strands, natural fibers of wool or cotton, cellulosic particles or fibers, etc. may be used. Woven or non-woven mats of the fibers may be employed. As indicated hereinabove, exceptional properties are obtained with the process using high density glass mats. The polyisocyanurate polymer compositions of the present invention are essentially non-cellular rigid composites. However, due to the possibility of small amounts of water being present in the reaction components, i.e., polyisocyanate and alkylene carbonate as well as the adduct catalyst, the composition may contain small or micro cells in the cured polymer.

Although excellent mold release is obtained with the cast or transfer molding formulations of the instant invention alone, external or internal mold release agents such as, for example, the dimethyl siloxanes with organic acid groups may be employed.

The present invention is more fully illustrated by the following examples, which include particular features of the invention. However, the examples are not to be construed as limiting the invention in any way, it being understood that numerous variations are possible without departing from the spirit and scope of the invention.

EXAMPLE 1

Preparation of a Soluble Tertiary Amine-Propylene Carbonate Adduct Catalyst as Used in the Instant Invention 3995 gm of propylene carbonate ("ARCONATE" 5000 sold by Arco Chemical division of Atlantic Richfield Co.) was dried by passing it through a bed of activated alumina. 40.35 gm of triethylene diamine was added to the propylene carbonate with mixing at 80° C. for 112.5 hours (to form the adduct and age the mixture) at which time the mixture turned into a dark brown catalyst solution.

EXAMPLES 2-5

The following examples describe the preparation of a molded composite using a carbodiimide modified diphenylmethane diisocyanate ("Isonate-143L" sold commercially by Dow Chemical Co,) 182 gm of "Isonate-143L," 70.2 gm of propylene carbonate and 7.8 gm of the catalyst solution of Example 1 was mixed at room temperature (~25° C.). The mixture was poured onto varying amounts of Owens Corning M8610 glass mats which were placed in 6.5×9.5×01 inch brass molds and the molds placed in a preheated (82° C.) hydraulic press and allowed to cure for 30 minutes under 450 psi pressure. The press was then cooled for 10 minutes and the molded composite removed. The composite was then cut for testing. Material composition and physical properties taken at room temperature of 25° C. are shown in Table 1.

TABLE 1

| Example No. | 2 | 3 | 4 | 5 |
|---|---|---|---|---|
| % Isocyanate | 70 | 70 | 70 | 70 |
| % P. Carbonate | 30 | 30 | 30 | 30 |
| % Glass | 21 | 32 | 39 | 48 |
| Glass Layers - Wt. | 1-3 oz | 1-3 oz + 1-1.5 oz | 2-3 oz | 2-3 oz + 1-1.5 oz |
| Glass Thickness (in.) | 0.10 | 0.10 | 0.10 | 0.10 |
| Notched Izod Impact (ft. lbs/in.) | 14.0 | 16.7 | 19.0 | 26.6 |
| Tensile Strength (psi) | 7747 | 15244 | 15625 | 21745 |
| Elongation % | 2.60 | 3.80 | 3.50 | 5.20 |
| Flex Strength (psi) | 14866 | 26422 | 28366 | 31872 |
| Flex Modulus (psi) | 577380 | 927260 | 989860 | 1356400 |

EXAMPLE 6

The following example describes the preparation of a polyisocyanurate compositions employing a glycol modified high purity diphenylmethane diisocyanate. 45.5 gm of "Isonate-181", 18.2 gm of propylene carbonate and 1.3 gm of the catalyst solution of Example 1 were mixed at room temperature of ~25° C. and poured into a 6.5×9.5×0.1 inch brass mold containing 31% glass consisting of one 3 oz. layer and one 1.5 oz. layer of fiber glass mats (Owens Corning M8610) having a thickness of 0.10 inch. The filled mold was placed in a preheated (82° C.) hydraulic press and allowed to react and cure for 30 minutes under 450 psi pressure. The mold was cooled in the press for 10 minutes, removed and the composite cut for testing. "Instron" testing of the material gave an Izod impact strength of 9.8 ft-lbs/in, tensile strength of 6387 psi, elongation % of 3.1, and a flex strength and flex modulus of 15257 psi and 501860 psi respectively.

EXAMPLE 7

The procedure of Example 5 was repeated using the same amounts of isocyanate, propylene carbonate and catalyst solution with 39% glass in the form of two 3 oz. layers having a thicknes of 0.10 inch. Testing of the resulting molded polyisocyanurate gave an Izod impact strength of 20.2 ft-lbs/in., atensile strength of 18305 psi, elongation of 4.4% and a flex strength and modulus of 18299 psi and 692790 psi respectively.

EXAMPLE 8

The following example describes the preparation of a polyisocyanurate polymer composite using polymeric diphenylmethane diisocyanate ("Mondur MRS" sold commercially by Mobay Chemical Co.). 182 gr of isocyanate, 50.5 gm of propylene carbonate and 26.7 gm of the catalyst solution of Example 1 were mixed at room temperature of ~25° C. Enough of the mixed reactants and catalyst were poured in a 6.5×9.5×0.1 inch brass mold containing 20% glass in the form of a mat of 0.10 inch thickness to fill the mold, and the mold placed in a preheated (82° C.) hydraulic press and allowed to cure for 30 minutes under 450 psi pressure. The mold was cooled for 10 minutes in the press and then removed. The composite was then cut for testing. "Instron" testing of the polyisocyanurate composite gave an Izod impact strength of 11.7 ft-lbs/in, tensile strength of 5880 psi, elongation of 2.7%, a flex strength of 11878 psi and a flex modulus of 426900.

EXAMPLE 9

Example 8 was repeated employing 156 gm of isocyanate, 78.0 gm of propylene carbonate and 26 gm of catalyst solution which were mixed at room temperature. Enough of the reaction mixture with catalyst was poured into the brass mold containing 20% glass in the form of a mat of 0.10 inch thickness to fill the mold and the mold heated and cured as in Example 8. Testing of the resulting molded polyisocyanurate gave an Izod impact of 11.7 ft-lbs/in, tensile strength of 5760 psi, elongation of 2.4% and a flex strength and flex modulus of 13024 psi and 467760 psi respectively.

EXAMPLES 10-14

The following examples show the preparation of polyisocyanurate compositions employing various ratios of gylcol modified diphenylmethane diisocyanate ("Isonate 181" Dow Chemical Co.) and propylene carbonate in the absence of any reinforcement. The isocyanate, propylene carbonate and catalyst solution (at a 0.02% concentration) of Example 1 were mixed at room temperature and poured into a 6.5×9.5×0.1 inch brass mold. The filled mold was then allowed to cure for 30 minutes at a temperature of 80° C. and then cooled and the composite removed. The polyisocyanurate composite was then cut for testing. The material composition and physical properties are shown in Table 2.

EXAMPLES 15-18

The following examples show the preparation of polyisocyanurate compositions using various ratios of carbodiimide modified diphenylmethane diisocyanate ("Isonate-143L"-Dow Chemical Co.) and propylene carbonate with the catalyst of Example 1 at a concentration of 0.03% in the absence of any reinforcement. The isocyanate, propylene carbonate and catalyst solution were mixed at room temperature and poured into a 6.5×9.5×0.1 inch brass mold. The filled mold was then allowed to cure for 30 minutes at a temperature of 100° C. and then cooled and the composite removed and cut for testing. The polyisocyanurate composition and physical properties are shown in Table 3.

TABLE 2

| Example No. | 10 | 11 | 12 | 13 | 14 |
|---|---|---|---|---|---|
| % Isocyanate | 90 | 80 | 70 | 60 | 50 |
| % Propylene Carbonate | 10 | 20 | 30 | 40 | 50 |
| Notched Izod Impact (ft-lbs/in) | 0.23 | 0.79 | 0.96 | 0.6 | 0.74 |
| Tensile Strength (psi) | 7391 | 10637 | 7110 | 3672 | 1082 |
| Elongation (%) | 2.40 | 7.90 | 6.60 | 10.50 | 19.50 |
| Flex Strength (psi) | 6937 | 11951 | 8940 | 3864 | 669 |
| Flex Modulus (psi) | 485693 | 425740 | 284340 | 171090 | 25503 |

TABLE 3

| Example No. | 15 | 16 | 17 | 18 |
|---|---|---|---|---|
| % Isocyanate | 80 | 70 | 60 | 50 |
| % Propylene Carbonate | 20 | 30 | 40 | 50 |
| Notched Izod Impact (ft-lbs/in) | 0.37 | 0.55 | 0.38 | 0.42 |
| Tensile Strength (psi) | 10969 | 7714 | 5915 | 4060 |
| Elongation (%) | 6.60 | 5.00 | 6.60 | 7.60 |
| Flex Strength (psi) | 10422 | 9082 | 6171 | 3911 |
| Flex Modulus (psi) | 374820 | 331240 | 252620 | 183460 |

EXAMPLE 19

35 gm of diphenylmethane diisocyanate ("Isonate 143L") 14 gm ethylene carbonate and 1 gm of a 5% solution of a 24 hour aged N, N, N',N'-tetramethyl ethylene diamine in propylene carbonate (0.1% catalyst concentration of total composition were mixed at room temperature and poured into a 6.5×9.5×0.1 inch brass mold to fill the mold maintained at 82° C. The solution set in about 1.0 minutes to give a rigid cast molded polyisocyanurate polymer.

EXAMPLE 20

996 gm of diphenylmethane diisocyanate ("Isonate "181"), along with 387 gm propylene carbonate containing catalyst solutions of Example 1 at a concentration of 0.08% were pumped into a static mixing chamber and the reaction mixture conveyed into a 19×25×0.125 inch closed aluminum mold containing 2 layers of 1½ oz. glass mat (Nico Fibers Co. 754 treated glass fibers) and 1 layer of 1½ oz. continuous glass fiber mat (Owens Corning M8610). The filled mold was maintained at 65° C. for 15 minutes. The mold was cooled and the composite removed for testing. Test results showed a tensile strength of 9000 psi, notched Izod Impact of 14 ft.lbs/in, flex strength of 16,000 psi and a flex modulus of 520,000 psi. The composite contained 28% glass and had a sp.gr. of 1.37 g/cc.

I claim:

1. A method for the preparation of a rigid cast or transfer molded polyisocyanurate thermoset polymer composition which comprises conveying from a mixing chamber into a mold cavity of the desired configuration, which may be compressed to react at temperatures of from about ambient to about 140° C. a reaction mixture of an organic di- or polyisocyanate and from about 2 to about 50 parts by weight of a cyclic alkylene carbonate, based on the isocyanatecarbonate composition, and a soluble adduct of a tertiary amine and a cyclic alkylene carbonate as catalyst at a concentration of from about 0.005 to about 5.0 weight percent based on the total composition.

2. A method according to claim 1 wherein the cyclic alkylene carbonate is employed in amounts of from about 20 to about 35 parts by weight.

3. A method according to claim 1 wherein the catalyst adduct is employed at a concentration of from about 0.008 to about 1.0 weight percent.

4. A method according to claim 1 wherein the organic di- or polyisocyanate is diphenylmethane diisocyanate.

5. A method according to claim 4 wherein the diphenylmethane diisocyanate is carbodiimide modified.

6. A method according to claim 4 wherein the diphenylmethane diisocyanate is glycol modified.

7. A method according to claim 1 wherein the alkylene carbonate is propylene carbonate.

8. A method according to claim 1 wherein the alkylene carbonate is ethylene carbonate.

9. A method according to claim 1 wherein the soluble adduct is a reaction complex of triethylene diamine and propylene carbonate.

10. A method according to claim 1 wherein the adduct is formed by reacting and aging the tertiary amine and cyclic alkylene carbonate for a time sufficient to form an effective catalyst concentration of the adduct.

11. A method according to claim 1 wherein the polyisocyanurate reaction mixture is molded into glass fiber mats.

12. A method for the preparation of a rigid cast or transfer molded polyisocyanurate thermoset polymer composition which comprises conveying from a mixing chamber into a mold cavity of the desired configuration, which may be compressed, to react at temperatures of from about ambient to about 140° C. a reaction mixture of diphenylmethane diisocyanate and from about 20 to about 35 parts by weight of propylene carbonate, based on the isocyanate-carbonate composition, and a soluble adduct of triethylene diamine and propylene carbonate at a concentration of from about 0.008 to about 1.0 weight percent based on the total composition.

* * * * *